Figure 1:
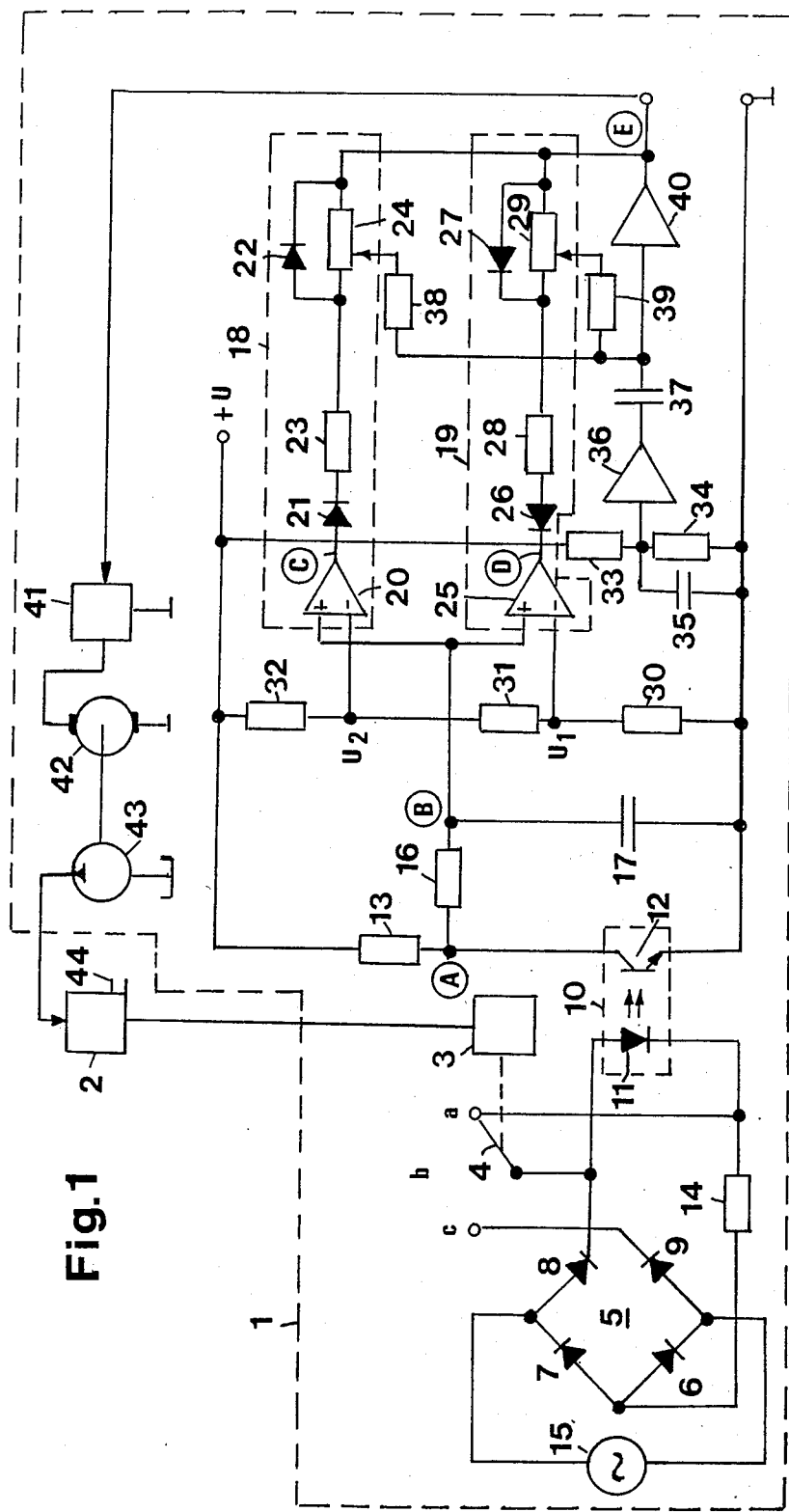

United States Patent [19]

Møller

[11] Patent Number: 4,654,539
[45] Date of Patent: Mar. 31, 1987

[54] CONTINUOUS-LIKE ACTUATOR

[75] Inventor: Henry Møller, Nordborg, Denmark

[73] Assignee: Danfoss A/S, Nordborg, Denmark

[21] Appl. No.: 799,258

[22] Filed: Nov. 18, 1985

[30] Foreign Application Priority Data

Nov. 28, 1984 [DE] Fed. Rep. of Germany ....... 3443259

[51] Int. Cl.$^4$ ............................................ H01H 35/24
[52] U.S. Cl. .................................................. 307/118
[58] Field of Search ................. 307/112, 118; 318/335, 318/481; 323/349; 363/84, 85, 86, 89, 125, 126

[56] References Cited

U.S. PATENT DOCUMENTS 2,516,386 7/1950 Hofer .................................. 318/481
4,596,514 6/1986 Matsumoto et al. ................ 318/481

Primary Examiner—William M. Shoop, Jr.
Assistant Examiner—Richard K. Blum
Attorney, Agent, or Firm—Wayne B. Easton

[57] ABSTRACT

The invention relates to an electrical control unit for controlling the speed of a pump motor of a pressurized fluid supply system having a tank. A pressure responsive switch unit connected to the tank has at least three switch positions corresponding to pressure levels in the tank. The switch unit outputs three different voltage levels to a transistor and circuitry responsive to the three voltage levels utilizes this input to control the speed of the pump motor. The circuitry includes an integration capacitor and the effects of charging and discharging the capacitor in accordance with the three voltage levels produced by the switch unit are utilized for controlling the pump motor.

3 Claims, 6 Drawing Figures

CONTINUOUS-LIKE ACTUATOR

The invention relates to a continuous-like actuator for regulating or control means, comprising a change-over switch which can be switched over from one limiting position to another depending on the size of a control signal, and a smoothing circuit feedable in response to the switch position with different pulses having a mean value corresponding to the control signal.

A known actuator of this kind contains a bimetallic switch which, depending on the difference or departure between the existing and desired temperature values, will switch on the one or other of two different DC voltages for a longer or shorter time to a smoothing circuit containing an ohmic resistor in series with a condenser or a choke. A substantially smoothed actuating signal will then be derived at the output of the smoothing circuit. However, this construction calls for frequent operation of the change-over switch between the two voltages, even if the temporal mean value of the DC voltages applied to the smoothing circuit corresponds to the set desired value. This reduces the life of the change-over switch. Further, a high smoothing expenditure is required in the DC circuit (high capacitance and inductance) to obtain an actuating signal that is as continuous as possible. Similarly, to form the two DC voltages one requires either expensive batteries and the like or rectifiers with smoothing means, possibly voltage transformers, e.g. voltage dividers, to achieve the different DC voltages.

The invention is based on the problem of providing a continuous-like actuator of the aforementioned kind, in which a longer life for the change-over switch is obtained at less expense.

According to the invention, this problem is solved in that a rectifier circuit feedable with AC voltage is provided, in which the connection of diodes can be so changed by the change-over switch that the rectifier circuit acts as a one-way or two-way rectifier depending on the two limiting positions and an intermediate position of the change-over switch and its DC circuit is coupled to or separated from the smoothing circuit.

In this construction, less frequent operation of the change-over switch is required because in the intermediate position of the change-over switch one can produce a mean actuating signal which is at least close to the desired value, so that the change-over switch will mostly assume its intermediate position. Further, batteries or expenditure for smoothing can be dispensed with on the input side of the change-over switch. At the same time, the expense in the smoothing circuit on the output side of the change-over switch can be kept low because the harmonic content of substantially sinusoidal half waves is less than that of square waves. The change-over switch can be a simple two pole change over switch and nevertheless be adapted to transmit three different actuating signals.

Preferably, the smoothing circuit is connected by way of a drop resistor to a constant DC voltage and in parallel with a transistor device in the form of an optocoupler or phototransistor, the light generator of which lies in the DC circuit and which is de-energised in the one limiting position of the change-over switch. In this limiting position a constant DC voltage will then already be applied to the smoothing circuit, namely the highest applied to the smoothing circuit, so that in this case there is no smoothing by the smoothing circuit. The expense in the smoothing circuit can be reduced accordingly.

Preferably, the change-over switch short-circuits the light generator in the one limiting position and connects the rectifier circuit as a two-way bridge rectifier in the other limiting position, the change-over switch in this other limiting position interconnecting the cathode of two diodes that form the plus pole of the two-way bridge rectifier. The output voltage of the smoothing circuit will be the largest or smallest at the two limiting positions of the change-over switch and has an intermediate value in the intermediate position of the change-over switch in which the rectifier circuit is connected as a one-way rectifier.

The output of the smoothing circuit may be connected to two trigger stages which have different threshold values and, on exceeding their threshold value, produce oppositely poled DC voltages as charging voltages for an integration condenser. In this way, it is possible to transform the on average constant output voltages of the smoothing circuit into substantially linearly rising or falling control voltages depending on their size, so that the actuator receives an I behaviour (integral behaviour) which permits a continuous approach right up to the desired value.

Further, one can ensure that each trigger stage comprises a comparator, one input of which lies at a reference potential determining its threshold value and the other input of which is connected to the output of the smoothing circuit, and on the output side two diodes connected in series in the same sense and a voltage divider parallel to the second of these diodes, that the tapping of the voltage divider is connected to the one connection of the integration condenser by way of a charging resistor, the other connection of the integration condenser being at a reference potential, and that the one connection of the integration condenser is connected by way of an amplifier with an amplification of about 1 to that end of the series circuits of these diodes that is remote from the comparators.

The (second) diodes of the trigger stages on the output side will here, in so far that a current passes through them, form constant voltage sources of opposite polarity which, in conjunction with the amplifier having an amplification of 1, ensure charging or discharging of the integration condenser with a constant current, so that the voltage at the condenser and hence the output voltage at the amplifier rises or falls linearly as is desired.

The reference potential of the integration condenser preferably lies between the reference potentials of the comparators. In this way, one obtains rapid approach of the quantity to be regulated to the desired value when switching the regulating or control means on.

If the reference potential of the integration condenser is tapped at a voltage divider resistor which is bridged by a condenser, one obtains a gentle start or continuous increase in the actuating signal even when the equipment is switched on.

A preferred example of the invention and its developments will now be described in more detail with reference to the drawing, wherein:

FIG. 1 is a circuit diagram of regulating means having an actuator and regulating path according to the invention, and FIGS. 2A to 2E shows the course of different voltages at particular points in the FIG. 1 circuit.

The regulating means 1 of FIG. 1 regulate the pressure in a container 2 or tube system forming the regulating path and contain a regulator 3 with a pressure sensor which forms a comparator and at which one can set the desired pressure value in a manner not shown. The other components of the regulating means 1 form an actuator.

The output signal of the regulator 3 that forms the regulating means or regulating difference controls a change-over switch 4 as is indicated by the broken line between the regulator 3 and change-over switch 4. The change-over switch 4 therefore assumes a first limiting position at a fixed contact a depending on the size of the signal controlling it, an intermediate position in a zone b and a second limiting position at a fixed contact c. The transition from the limiting position at contact a to the limiting position at contact c takes place continuously, i.e. without trigger function and without the change-over switch 4 staying in the intermediate position in zone b.

The change-over switch is at the output of a rectifier circuit 5 of four diodes 6, 7, 8 and 9.

An opto-coupler 10 contains a luminous diode as light generator 11 and a phototransistor as light receiver 12. The light generator 11 is in series with a current limiting resistor 14 in the DC circuit of the rectifier circuit 5, it also being possible for the resistor 14 to be in the AC circuit of the rectifier circuit 5. The rectifier circuit 5 is energised by an AC voltage source 15 formed by the normal AC mains.

In the limiting position at contact a, the change-over switch 4 short-circuits the light generator 11. In the intermediate position in zone b, the diodes 6 and 8 form a one-way rectifier, and in the limiting position of the change-over switch at contact c, the diodes 6 to 9 define a two-way rectifier, the change-over switch 4 connecting the cathodes of diodes 8 and 9 that form the plus pole of the two-way rectifier.

The light receiver 12 is parallel to a smoothing circuit consisting of a resistor 16 and a condenser 17. The smoothing circuit is energised by way of a drop resistor 13 from a constant operating voltage U of about 12 volt.

The voltage $U_B$ at the output of the smoothing circuit or smoothing condenser 17 is fed to two trigger stages 18 and 19. The trigger stage 18 contains a comparator 20 and, in the output circuit of the comparator 20, two diodes 21 and 22 connected in the same sense, a current limiting resistor 23 between the diodes 21 and 22, and a voltage divider 24 parallel to the second diode 22 on the output side. The trigger stage 19 also contains a comparator 25 and, in the output circuit of the comparator 25, two diodes 26 and 27 connected in series in the same sense, a current limiting resistor 28 between the diodes 26 and 27, and a voltage divider 29 parallel to the second diode 27 on the output side.

The diodes 21, 22 of trigger stage 18 are, however, pole opposite to the diodes 26, 27 of trigger stage 19.

The non-inverting inputs (+) of the comparators 20, 25 are connected to the output B of the smoothing circuit and the inverting inputs (−) of the comparators 20, 25 are each connected to a different tapping of a voltage divider which consists of resistors 30, 31 and 32 and is likewise applied to the DC operating voltage U.

The tapping of a further voltage divider consisting of resistors 33 and 34 applied to the DC operating voltage as well as of a condenser 35 parallel to the resistor 34 on the earth side is connected to the one connection of an integration condenser 37 by way of an amplifier 36 with an amplification of about 1:1. The other connection of the integration condenser 37 is connected by way of equal charging resistors 38 and 39 to the tappings of the voltage dividers 24 and 29 which each have an adjustable and a fixed resistor in series and, by way of an amplifier 40 with high input resistance and an amplification of about 1:1, to the outputs of trigger stages 18 and 19.

The output E of amplifier 40 is connected to a frequency control input of an inverse rectifier 41. The latter feeds a motor 42 driving a pump 43 which fills the container 2 with pressure fluid and is driven at a speed corresponding to the frequency of the inverse rectifier 41. The pressure fluid is withdrawn at an outlet 44 of the container 2.

Figure 2A:
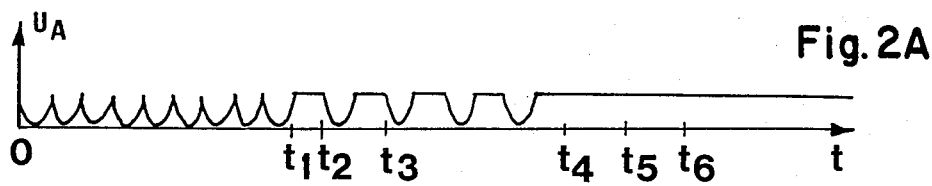
Figure 2B:
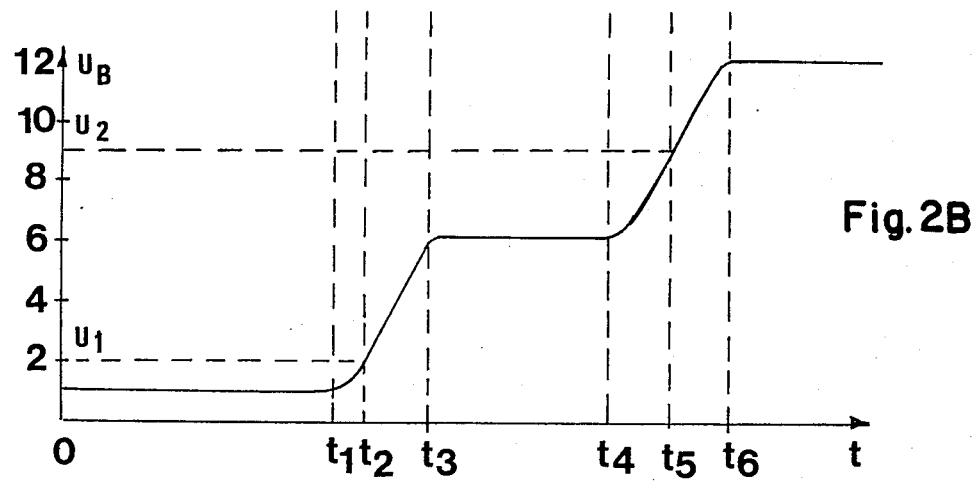

The operation of the regulating means is as follows:

At a high pressure in the container 2, the change-over switch 4 assumes the limiting position at the contact c. In this position, two-way rectified current of substantially sinusoidal half waves flows through the luminous diode 11 and the phototransistor 12 of the opto-coupler 10. The voltage $U_A$ at point A in FIg. 1 therefore has somewhat the course showing in FIG. 2A in the form of two-way rectified inverse substantially sinusoidal half waves. Accordingly, the voltage $U_B$ at the output B of the smoothing circuit has its lowest value as shown in FIG. 2B. This value is lower than the reference potential $U_1$ at the inverting input (−) of comparator 25 and lower than the reference potential $U_2$ at the inverting input (−) of comparator 20. The output voltages $U_C$ and $U_D$ at the outputs C and D of comparators 20 and 25 are therefore (practically) zero. The amplifier 40 therefore drives a current through the diodes 26 and 27 whilst the diodes 21 and 22 are blocked. By reason of the constant pass voltage drop at diode 27, the voltage at the voltage divider resistor 29 is also constant. Further, since the voltage drop at amplifier 40 is practically zero on account of the amplification of 1:1, the voltage at resistor 39 is also substantially equal to the constant voltage that is tapped at the voltage divider 29 between the output E and resistor 39, i.e. the voltage at resistor 39 is also substantially constant. Since the input current of amplifier 40 is negligibly small, a constant current likewise flows through the integration condenser 37 and linearly discharges the integration condenser 37. This is shown by the course in FIG. 2E of the output voltage $U_E$ at output E between the instants O and $t_2$. The output voltage E therefore linearly reduces the frequency of the inverse rectifier 41, the speed of motor 42 and of the pump and thus a corresponding reduction of the pressure in the container 2. At the time $t_1$, the pressure has decreased to such an extent that the change-over switch 4 has moved out of the limiting position at the contact c and moves to an intermediate position in the zone b. In this intermediate position, only a one-way rectified (broken) current flows through the luminous diode 11 and the phototransistor 12 because the AC source 15 can drive a current only by way of the diodes 8 and 6. Accordingly, the voltage $U_A$ at point A or at the phototransistor 12 has somewhat the course shown in FIG. 2A between the times $t_1$ and $t_3$. In the zone between $t_1$ and $t_3$, the mean value of voltage $U_A$ is thus higher than in the zone between O and $t_1$, so that the condenser 17 will start to charge to a higher voltage $U_B$ at the time $t_1$, as is shown in FIG. 2B.

Figure 2C:
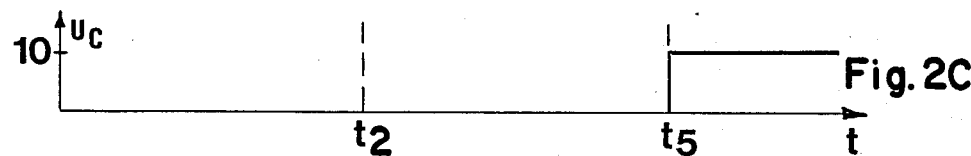
Figure 2D:
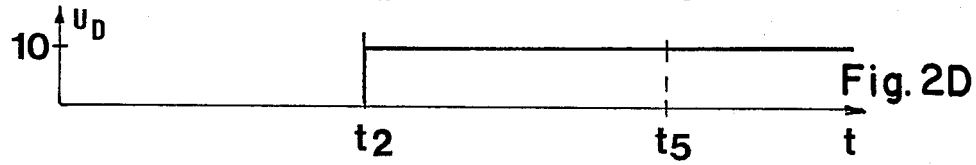
Figure 2E:
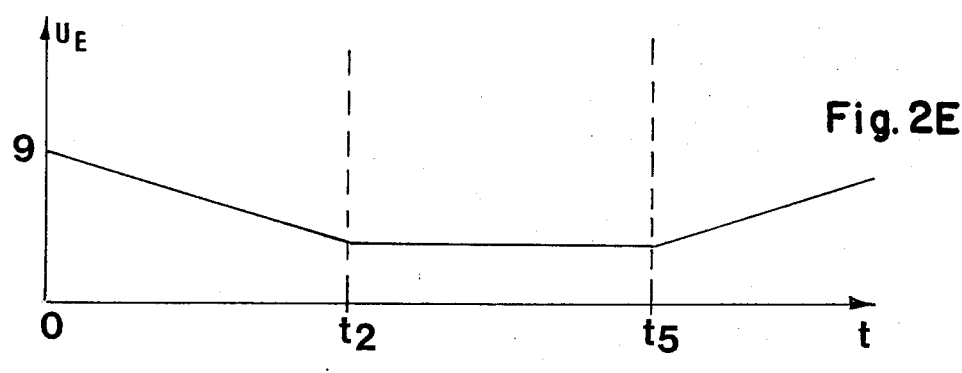

At the time $t_2$, the voltage $U_B$ will exceed the voltage $U_1$ tapped at resistor 30, so that the output voltage $U_D$ of comparator 25 will now jump to a higher positive value, as is shown by FIG. 2D. On the other hand, the voltage $U_B$ does not yet reach the value of voltage $U_2$ which, as a whole, drops at the resistors 30 and 31, so that the output voltage $U_C$ of comparator 20 remains at zero (FIG. 2C).

In the intermediate position of the change-over switch 4, all diodes 21, 22, 26 and 27 are blocked. The integration condenser 37 can therefore neither charge nor discharge and therefore retains the voltage it reached at the time $t_2$. As long as the change-over switch 4 remains between the limiting positions a and c, the the output voltage $U_E$ (FIG. 2E) therefore remains constant even though the voltage $U_B$ at the smoothing condenser 27 continues to rise up to the time $t_3$ (and at the same time also the voltage $U_A$ somewhat but this is neglected in the FIG. 2A illustration) to a new mean value corresponding to the new mean value of voltage $U_A$. Accordingly, the pressure in container 2 also remains constant if there is no interference.

Assume that at the time $t_4$ the pressure in container 2 has dropped to an extent that the change-over switch 4 reaches the limiting position at contact a. In this position, the light emitting diode 11 is short-circuited by the change-over switch 4 so that the diode 11 and the phototransistor 12 are de-energised. The voltage $U_A$ at the point A now ceases to pulsate. The smoothing condenser 17 is thus charged to a higher voltage $U_B$ until the instant $t_6$ (the voltage $U_A$ simultaneously rises somewhat further but this has been neglected in FIG. 2A for the sake of simplicity).

At the time $t_5$, the voltage $U_B$ at the smoothing condenser 17 also exceeds the voltage $U_2$, so that the output voltage $U_C$ of the comparator 20 also jumps to a positive higher value (FIG. 2C). The diodes 21 and 22 which are now conductive permit linear charging of the integration condenser 37 and hence an increase in the pressure in the container 2 again.

The voltage tapped at the voltage divider formed by the resistors 32 and 34 determines the starting value of the integration. This voltage is between $U_1$ and $U_2$, so that the integration condenser 37 more rapidly reaches the desired value when the regulating means are switched on. To achieve a gentle start, the resistor 34 is bridged by the condenser 35.

The charging and discharging speed of the integration condenser 37 can be determined by means of the adjustable voltage dividers 24 and 29.

The resistances of resistors 23 and 28 are selected to be equal, as are the resistors 24 and 29.

The change-over switch 4 can be a three position switch with a further fixed contact at a position in the middle between the contacts a and c. This middle contact would, however, remain free. Further, the regulator 3 and change-over switch 4 can be in the form of a structural unit, i.e. a pressostat.

Between the output E of amplifier 40 and its input as well as earth, there can in each case be a resistor for discharging the integration condenser 37 after switching the regulating means 1 off, so that the amplifier 40 will not be loaded by an excessively high voltage on switching on. "Resistors" here mean "ohmic" resistors.

Referred to an adjustment of the desired value (or the leading parameter), the regulating means 1 can be regarded as control means. The regulating means 1 will function as control means even on "open" operation, i.e. for example upon adjustment of the change-over switch 4 in response to a physical parameter other than the pressure in container 2 and not detected (measured) by the regulator 3, e.g. upon adjustment of the change-over switch by hand or according to a predetermined programme.

What is claimed is:

1. A control unit for controlling the pump motor of a pressurized fluid supply system having a pressure tank, comprising, a pressure responsive switch unit connected to said tank and having at least three switch positions corresponding to pressure levels in said tank, AC voltage means and bridge rectifier means connected to said AC voltage means, transistor means having an input connected to said bridge rectifier means by said switch unit, said switch unit having first and second switch positions at said transistor input, shunt means for said transistor input, and a third switch position for said switch unit which effects bypassing of said transistor input via said shunt means by said AC voltage means, a smoothing circuit connected to said transistor means to provide DC voltage levels corresponding to said three switch positions of said switch means, and control means responsive to said voltage levels for controlling said motor.

2. A control unit according to claim 1 wherein said control means includes an integration capacitor and trigger means having a different threshold levels connected to said smoothing circuit, said trigger means generating time spaced oppositely poled DC voltages as charging voltages for said capacitor, and circuitry responsive to the outputs of said trigger means to effect charging and discharging of said capacitor and responsive to the output of said capacitor to control said motor.

3. A control unit according to claim 2 wherein said control unit generates lower, intermediate and higher DC voltage levels at the output of said smoothing means corresponding to said three switch positions, said circuitry including means responsive (1) to said lower DC voltage level to cause discharging of said capacitor to effect a speed reduction for said motor, (2) to said intermediate DC voltage level to cause a balanced, charging and discharging of said capacitor to effect a constant speed for said motor, and (3) to said higher DC voltage level to cause charging of said capacitor to effect an increase in speed for said motor.

* * * * *